United States Patent [19]

David et al.

[11] Patent Number: 4,648,857
[45] Date of Patent: Mar. 10, 1987

[54] ARMOURED V-SHAPED BELT WITH METAL CONTACTS

[76] Inventors: Bernard David, 20, rue Rambervillers, F-75012 Paris, France; Roger Tetard, 5, rue de Bassano, F-75016 Paris, France

[21] Appl. No.: 873,307

[22] Filed: Jun. 9, 1986

Related U.S. Application Data

[63] Continuation of Ser. No. 539,610, Oct. 6, 1983, abandoned, which is a continuation-in-part of Ser. No. 217,003, Nov. 21, 1980, abandoned.

[30] Foreign Application Priority Data

Mar. 23, 1979 [FR] France .................................. 7907340
Mar. 19, 1980 [WO] PCT Int'l Appl. ... PCT/FR80/00009

[51] Int. Cl.⁴ .............................................. F16G 1/22
[52] U.S. Cl. ..................................... 474/272; 474/201
[58] Field of Search ............... 474/201, 242, 264, 272

[56] References Cited

U.S. PATENT DOCUMENTS

| | | | |
|---|---|---|---|
| 4,484,903 | 11/1984 | Schneider | 474/201 X |
| 4,501,578 | 2/1985 | Schneider | 474/201 |
| 4,516,965 | 5/1985 | Mott | 474/201 X |
| 4,579,547 | 4/1986 | McComber et al. | 474/201 |

FOREIGN PATENT DOCUMENTS 2505228 12/1976 Fed. Rep. of Germany .

Primary Examiner—James A. Leppink
Assistant Examiner—Thuy M. Bui
Attorney, Agent, or Firm—Browdy & Neimark

[57] ABSTRACT

Endless V-shaped belt, provided with longitudinal elements allowing the increase of the power transmitted with a conventional belt, comprises a rigid transverse part, integral with the longitudinal armature, used for the transmission of the motion by contact and pressure in the groove of a pulley, each transverse part being provided as a thin V-shaped plaquette (1), cut at the upper or lateral portion thereof to allow the passage and seating of the longitudinal armature.

22 Claims, 9 Drawing Figures

ARMOURED V-SHAPED BELT WITH METAL CONTACTS

This application is a continuation of application Ser. No. 539,610, filed 10/6/83, now abandoned, which is a continuation-in-part of application Ser. No. 217,003, filed 11/21/80, now abandoned.

BACKGROUND OF THE INVENTION

The present invention relates to power transmissions of the "belt" or "chain" and grooved pulley type, allowing, for equal power, the space required therefor to be considerably reduced, so as to be applied more particularly to speed variators of this type.

As is known, very numerous types of variators exist in industry. All are heavy and cumbersome with respect to the power transmitted, which practically prohibits use thereof in vehicles. We find among them variators of the V-belt or chain and grooved pulley type. The belt variator is cumbersome because of the fragility of its textile belt. The chain variator, in addition to its less smooth operation, is also cumbersome because of the smallness of the surfaces in contact with the driven pulleys.

Other known variators are lighter and they use belts made of metallic strip-irons and with a direct metallic bearing-surface into the groove of the pulleys, of the type described in the German Patent Application published before Examination (Offenlegungsschrift) to HEYNAU No. 2 505 228 and in U.S. Pat. No. 3,949,621 to VARITRAC; those variators allow the transmission of more power than the belts having an elastomeric surface bearing on metal of the type described in the German Patent Application to VARITRAC No. 2 821 698 to which corresponds U.S. Pat. No. 4,213,350 to HOROWITZ; they, however, require a very high tensil stress and are very heavy; moreover, the strip-irons in contact with the transverse elements tend to wear and their manufacture is very complicated due to the necessity of using concentric strip-irons, without weld.

The belt according to the present invention in which the transverse elements are integral with an armature made of steel cable uses the principle of transmission metal on metal and a very strong armature able to take a high tensile stress, while eliminating the drawbacks of the belts made of strip-irons.

SUMMARY OF THE PRESENT INVENTION

The belt in accordance with the invention comprises a series of transverse plaquettes made either from a material increasing the friction, or from metal, for example treated wear-resistant steel or else from any other material, magnetic or not, able to provide the connection by friction. These plaquettes may be provided with a recess for receiving the cable or any other components capable of serving as a longitudinal armature (strip, braid, etc. . .). The plaquettes are solidly locked with each other and with the armature by means of an elastomer in which the assembly is embedded at the contact level of the armature and the plaquettes. The elastomer may be chosen so as to be oil-resistant (nitrile rubber, for example).

Besides the above arrangements, the invention comprises further arrangements which will become clear from the following description.

BRIEF DESCRIPTION OF THE DRAWINGS

The invention will be better understood with the help of the complement of description which follows, which refers to the accompanying drawings, in which.

It will of course be understood that these drawings and the corresponding descriptive parts are given solely by way of illustration of the subject of the invention of which they form in no manner a limitation.

DETAILED DESCRIPTION OF THE INVENTION

As shown, the belt comprises transverse plaquettes 1 having an external V shape, sufficiently cut-out at their upper part to receive, in the vicinity of the median plane perpendicular to the height of the trapezium, a single row composed of one or more cables 2 of metallic or similar fibers wound symmetrically with respect to the plane of symmetry of the belt, this arrangement, in the case of an even number of cables 2, avoiding the parasite deformations of the belt under traction. The cables 2 form the longitudinal armature of this endless belt.

Figure 5:
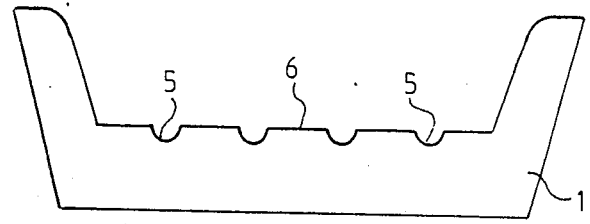
FIG. 5 is a cross section of another embodiment of the plaquette.
Figure 6:
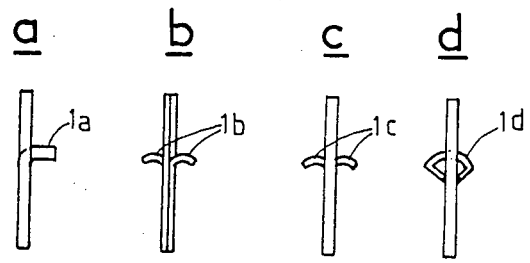
FIGS. 6a to 6d are embodiments of the toe of a plaquette.

Said armature rests directly into the cut-out part of the plaquettes 1. The winding of cable 2 must be the most even possible in order to avoid the parasite stresses during working of the belt. To this end, a machining of notches 5 (FIG. 5) having 1 to a few tenths of mm depth may be performed onto the surface 6 of the plaquettes 1, said notches 5 being used for positioning exactly cable 2. The cable path formed by the notches 5 has to be made helical according to the winding pitch of cable 2. Said winding pitch, which is of the order of one and a half diameter of the cable, must allow the presence of elastomer between two adjacent parts of the wound cable. Plaquettes 1 may comprise a toe 1a (see FIG. 6a) situated below the level of the cables, perpendicular to the surface of the trapezium and intended to distribute the pressure of the wound cable 2, at the moment when the plaquettes pass over the pulleys. The width of toe 1a is limited by the space between two successive plaquettes 1. This toe may have various shapes, namely:

shape 1a which has just been described, which is asymetrical and which is obtained by folding;

shape 1b (see FIG. 6b) made of two plaquettes 1 of half-depth each of which comprises a shape 1a, welded back to back. The advantage of such shape 1b lies in the symetry of the bearing of the longitudinal armature;

shape 1c (see FIG. 6c) to form 1b but obtained in one piece by forging plaquette 1;

shape 1d (see FIG. 6d) made of a rider inlaid onto plaquette 1.

In all cases, the total width of the plaquette must be smaller than the pitch of the concerned plaquettes. The sizes of the thicknesses of the plaquettes and of the spaces between the plaquettes are of the order of one to a few millimeters. The pitch of the plaquettes may be uneven in order to avoid resonance phenomena. Moreover, for the same purpose, the number of plaquettes may be chosen odd and preferably prime. An elastomer 3 joins the whole together by a known means, which consists in causing it to adhere strongly to the metal. The elastomer 3 does not run over laterally from the belt in order that the contact metal on metal with the grooves of the pulleys may be obtained.

According to an advantageous embodiment, the elastomer may be set back with respect to the plaquette 1, above and under the belt, in order to increase the flexibility.

For reasons of strength, the armature must be largely embedded (about two to three times the width of the cable). The shape of the set back for avoiding separation of the elastomer confers a festoon-look above the belt and an arch-look under it.

It is evident that the plaquettes described could also be cut-out or indented on both sides and then comprise a toe on each side, the introduction of the armatures being then effected laterally, or else be quite simply replaced by rods passing through the belt, so that their skew-shaped ends contact the internal faces of the grooves of the pulleys.

Figure 1:
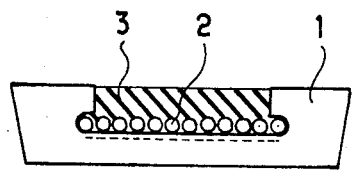
FIG. 1 is a cross section of the belt, with an embodiment of the plaquette.
Figure 2:
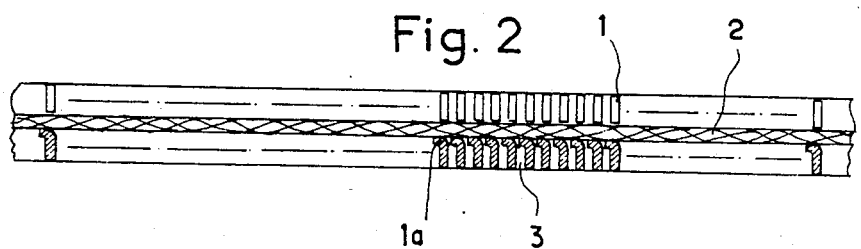
FIG. 2 is a longitudinal section of a part of the endless belt.
Figure 3:
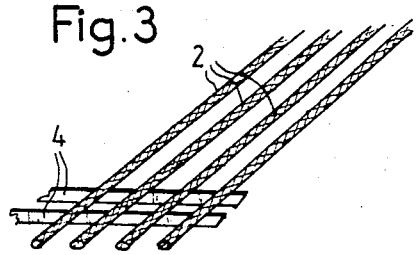
FIG. 3 is an elevational view of an embodiment having transverse rods.
Figure 4:
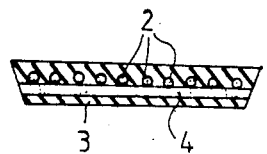
FIG. 4 is a sectional view of the embodiment of FIG. 3.

This latter embodiment is shown in FIGS. 3 and 4 which show that the rods 4, which may be circular, polygonal, and namely rectangular, in section, are in the same plane as the plaquettes 1 of FIGS. 1 and 2 which they replace. The armature cables 2 are supported on said rods 4. They could, finally, be replaced by any other pattern of rigid part solid with the movement of the armature of the belt, capable of transmitting the motion by contact with the grooves of the pulleys.

The armature instead of being formed of twisted metallic fiber cable strip, or braid, may be formed of a band of a few tenth of mm in depth, a width equal to the width of the bearing surface 6 of the plaquettes 1, and made of natural, synthetic or artificial woven fibers (such as "Kevlar" for instance).

The length of such a band might be such that when wound around itself, around the plaquettes 1, it might form an armature of about 1 to 2 mm in depth. In order to ensure a good penetration of the elastomer into the armature the band will have to be woven loose.

The belt, forming the subject matter of the invention, which may operate preferably in an oil bath, may be used anywhere where a power transmission is required, on a fixed machine or on a vehicle, whether it is a matter of a constant or variable ratio. It will preferably bear on V groove pulleys, made from an appropriate material: either an alloy increasing the friction or a treated wear-resistant metal. In order to increase the pressure of the belt in the groove of the pulley, the angle between the bearing faces of the belt may be reduced in comparison with that of a textile belt; it may be from 15° to 35°.

A particularly interesting application of this belt is represented by the equipment of variators which, because of the reduced space required therefor, may henceforth be advantageously fitted to motor vehicles in place of the gear boxes known up to present.

As is evident from what has gone before, the invention is in no wise limited to those of its embodiments and modes of application which have just been described more explicitly; it embraces, on the contrary, all variations which may occur to a technician skilled in the art, without departing from the scope or spirit of the present invention.

What is claimed is:

1. An endless trapezoidal belt having lateral edges for transmitting movement by contact and pressure into the grooves of pulleys, comprising:
   metallic transverse parts spaced longitudinally apart from one another, each provided with a recess at its upper extent, and a single thickness longitudinal metallic or similar armature, means for integrally connecting and unitarily interlocking said armature and transverse parts comprising an elastomer which adheres strongly to said metallic parts, said single thickness armature resting directly on the bottom of each said transverse part recess and said metallic transverse parts extending at least up to the lateral edges of the belt for bearing metal on metal into the grooves of the pulleys.

2. A belt according to claim 1 wherein the transverse parts comprise one or more bearing projections or toes for abutment against said longitudinal armature.

3. An endless trapezoidal belt having lateral edges for transmitting movement by contact and pressure into the grooves of pulleys, comprising:
   thin trapezoidal plaquettes spaced longitudinally apart from one another, each provided with a recess at its upper extent, and a single thickness longitudinal metallic or similar armature, said armature and thin trapezoidal plaquettes being integrally connected with one another by means of an elastomer, said single thickness armature resting directly on the bottom of the recess of each thin trapezoidal plaquette and said metallic thin trapezoidal plaquettes extending at least up to the lateral edges of the belt for bearing metal on metal into the grooves of the pulleys.

4. An endless trapezoidal belt having lateral edges for transmitting movement by contact and pressure into the grooves of pulleys, comprising:
   metallic transverse rods which pass laterally through the belt, said rods being spaced longitudinally apart from one another, and a single thickness longitudinal metallic or similar armature, said armature and said transverse rods being integrally connected with one another by means of an elastomer, said single thickness armature resting directly on the top of each said transverse rod and said metallic transverse rods extending at least up to the lateral edges of the belt for bearing metal on metal into the grooves of the pulleys.

5. A belt according to claim 2 wherein the transverse parts and armature are made of steel.

6. A belt according to claim 5 wherein the elastomer is nitrile rubber.

7. An endless trapezoidal belt having lateral edges for transmitting movement by contact and pressure into the grooves of pulleys, comprising:
   steel transverse parts, each provided with a recess at its upper extent, and a single thickness longitudinal steel armature, said armature and transverse parts being integrally connected with one another and being unitarily interlocked with each other by means of an elastomer which is oil-resistant and allows working of the belt in an oil-bath, said single thickness steel armature resting directly on the bottom of each said transverse part recess and said steel transverse parts extending at least up to the lateral edges of the belt for bearing metal on metal into the grooves of the pulleys.

8. A belt according to claim 1, wherein said armature is made of steel cable and said transverse parts comprise notches arranged according to a path of cable helically wound for obtaining a very even winding of the cable.

9. A belt according to claim 8, wherein the winding pitch of said cable is on the order of one and a half diameter of the cable for ensuring a good wrapping of the armature by the elastomer.

10. A belt according to claim 2, wherein said toe is asymetrical and is obtained by folding.

11. A belt according to claim 2, wherein a transverse part is made of two plaquettes of half-depth each of which comprises an asymetrical toe and which are welded together back to back.

12. A belt according to claim 2, wherein said toe is made of a rider inlaid plaquette.

13. Belt according to claim 1, wherein the transverse parts are arranged according to an uneven pitch.

14. Belt according to claim 1, wherein the transverse parts are present in an odd number.

15. Belt according to claim 14, wherein the transverse parts are present in a prime member.

16. Belt according to claim 1, wherein the armature is formed of a thin band of natural or synthetic fibers which comprises several superimposed windings, with the band being sufficiently loose for allowing penetration of the elastomer.

17. In an endless v-shaped belt having a plane of symmetry, the belt transmitting movement by contact pressure with the groove of pulleys, the improvement comprising:
    a plurality of spaced apart discrete elements disposed transverse to the longitudinal extent of said belt, each element including an upper portion having a recess;
    a single thickness elongated element disposed in the recess of each said discrete element and lying in the plane of symmetry of said belt; and
    elastomeric means for adhering to and joining said elongated element with each of said discrete elements so that a unitary assembly is formed, said elastomeric joining means extending into said recesses and retaining said elongated element in each of said recesses.

18. A belt according to claim 3, wherein said armature is made of a steel cable and said plaquettes comprise notches arranged according to a path of cable helically wound for obtaining a very even winding of the cable.

19. An endless V-shaped belt according to claim 17 comprising a plurality of elongated elements disposed in side-by-side relationship with said elongated element, said plurality of elongated elements being each disposed in a recess of each said discrete element and lying in the plane of symmetry of said belt, said elastomeric means also joining said plurality of elongated elements with each of said discrete elements.

20. A belt according to claim 1 wherein said metallic transverse parts are spaced apart from one another a distance at least on the order of the thickness of each said metallic transverse part.

21. An endless trapezoidal belt having lateral edges for transmitting movement by contact and pressure into the grooves of pulleys, comprising:
    metallic transverse plaquettes spaced longitudinally apart from one another, each provided with a recess at its upper extent with said recess having notches therein, and a longitudinal armature comprising a steel cable, said steel cable and said plaquettes being integrally connected with one another by means of an elastomer said cable resting directly in the notches at the bottom of each said plaquette recess and being helically wound to provide a very even winding of the cable, and said metallic plaquettes extending at least up to the lateral edges of the belt for bearing metal on metal into the grooves of the pulleys.

22. An endless trapezoidal belt having lateral edges for transmitting movement by contact and pressure into the grooves of pulleys, comprising:
    metallic transverse plaquettes spaced longitudinally apart from one another, each being provided with a recess at its upper extent, and a longitudinal metallic or similar armature made of fibers, means for integrally connecting and interlocking said armature and metallic transverse plaquettes comprising an elastomer which penetrates said armature and adheres strongly to said metallic transverse plaquettes, said armature resting directly on the bottom of each said transverse plaquette recess and said metallic transverse plaquettes extending at least up to the lateral edge of the belt for bearing metal on metal into the grooves of the pulleys.

* * * * *